UNITED STATES PATENT OFFICE.

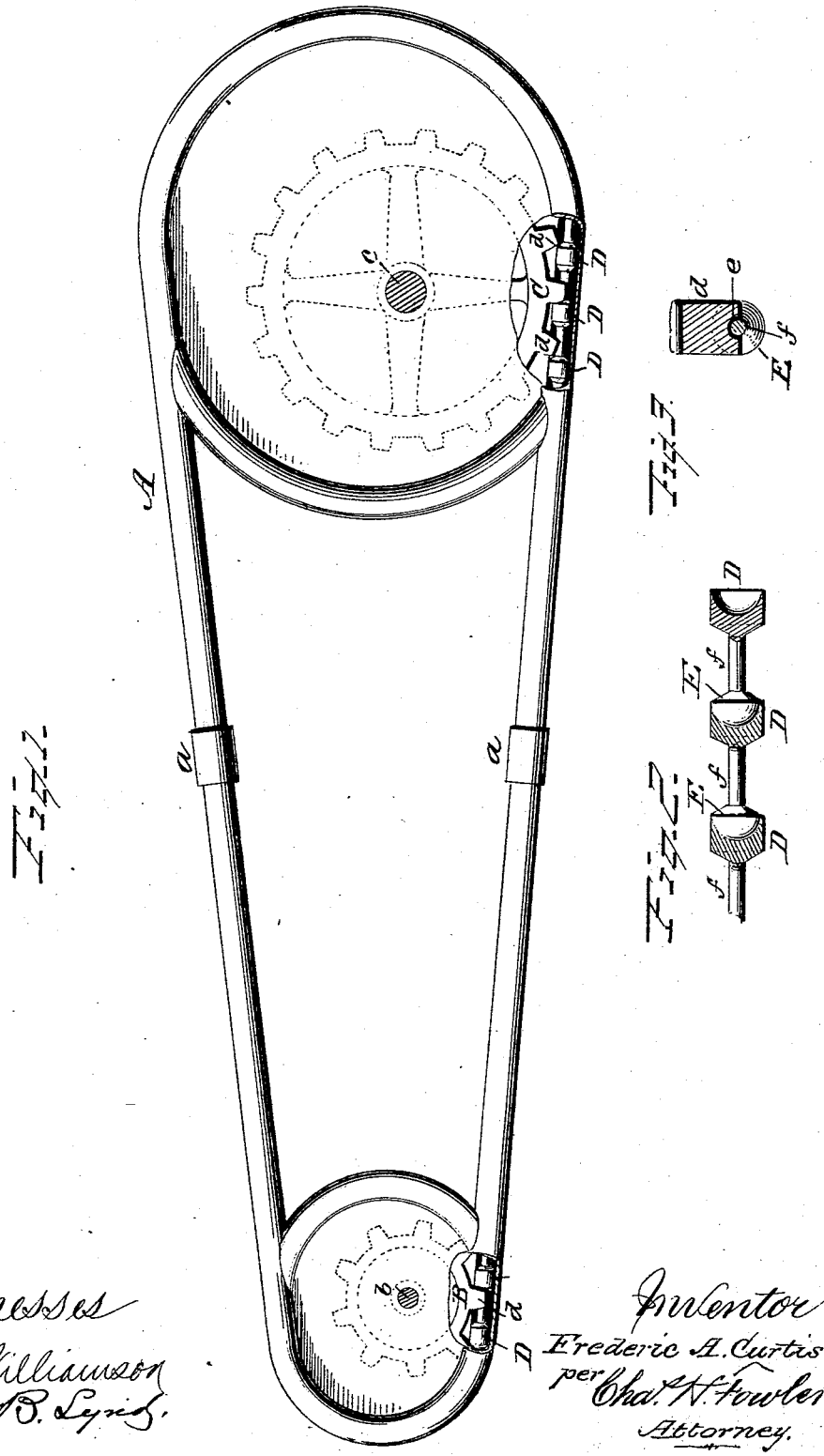

FREDERIC A. CURTIS, OF ANDERSON, INDIANA, ASSIGNOR TO THE WHEEL COMPANY, OF SAME PLACE.

GEARING.

SPECIFICATION forming part of Letters Patent No. 570,698, dated November 3, 1896.

Application filed December 21, 1895. Serial No. 572,915. (No model.)

*To all whom it may concern:*

Be it known that I, FREDERIC A. CURTIS, a citizen of the United States, residing at Anderson, in the county of Madison and State of Indiana, have invented certain new and useful Improvements in Gearing; and I do hereby declare that the following is a full, clear, and exact description of the same, reference being had to the annexed drawings, making a part of this specification, and to the letters of reference marked thereon.

The present invention has for its object to provide a driving-gear in which the chain and wheels are especially adapted in their construction to take the place of the ordinary sprocket chain and wheels for transmitting power from one wheel to the other; and the invention consists in a gearing constructed substantially as shown in the drawings and hereinafter described and claimed.

Figure 1 of the drawings is a side elevation, partly in section, showing the invention as applied to the driving-gear of a bicycle; Fig. 2, a detail view, partly in section and on an enlarged scale, showing the construction of the links from which the chain is formed; Fig. 3, a detail sectional view of one of the teeth of the wheel, showing the position of the chain when engaging therewith.

In the accompanying drawings, A represents a suitable casing which forms a continuous or endless channel for the endless chain, hereinafter described. The casing is preferably formed in sections and afterward connected together by suitable couplings $a$, of any well-known and preferred construction. The casing is constructed in such manner as to inclose the two driving-wheels B C, said wheels being mounted upon suitable shafts $b$ $c$ and one of the wheels provided with means for propelling it usually employed in bicycles.

The wheels B C have teeth $d$, which are formed with grooves or depressions $e$ to form a seat for the central brace $f$ of the links of an endless chain. The links comprising this endless chain consist of the central brace $f$, formed at its respective ends with a socket D and a hemispherical or convex head E, or a head of such shape as to correspond with the shape and form of the socket, so that when the links are together, as shown in Fig. 2 of the drawings, a universal joint will be formed between each link to provide a perfectly flexible endless chain to engage with the teeth of the wheels B C.

As will be noticed, each link is formed of one piece and no intermediate connection used between the links, thereby rendering the chain much simpler in construction than those heretofore in use and enabling each link to move upon its axis or laterally to adapt itself to any irregularities in the teeth of the wheels.

The chain and wheels may be applied as a gearing for communicating power from one wheel to another in the various classes of machinery where an endless chain or belt is used, and may also be applied as a power for the propulsion of vehicles, such as bicycles, tricycles, or other vehicles propelled by foot-power.

In contradistinction to the chains hereinbefore in use and to which my invention relates it will be noticed that the central stem or brace, as shown at $f$, is perfectly straight and round in cross-section, thereby adapting it to more perfectly work in connection with the sprocket-wheels in which the stem or brace engages.

A further feature of the chain resides in the socket D, which socket is inclosed around its sides and inner end, thus preventing grit or dirt working in between the hemipsherical head E and the socket and affecting the working of the chain.

The heads of the links are beveled on their inner sides, so as to correspond to the shape of the teeth $d$, and so that there will be as little friction between the teeth and links as possible.

Having now fully described my invention, what I claim as new, and desire to secure by Letters Patent, is—

An inclosing casing, and the sprocket-wheels revolving therein, provided with teeth $d$, having the grooves $e$ in their outer ends, combined with a series of links having enlarged ends and a straight central connecting part $f$; one of the ends being made convex on its outer end and the other concave, and both ends beveled on their inner sides where they come in contact with the grooved teeth, substantially as shown.

In testimony that I claim the above I have hereunto subscribed my name in the presence of two witnesses.

FREDERIC A. CURTIS.

Witnesses:
J. B. DILL,
THOS. BEMIS.